May 27, 1947.  A. Y. DODGE  2,421,190
HYDRAULIC TRANSMISSION CONTROL
Filed April 16, 1941   2 Sheets-Sheet 2

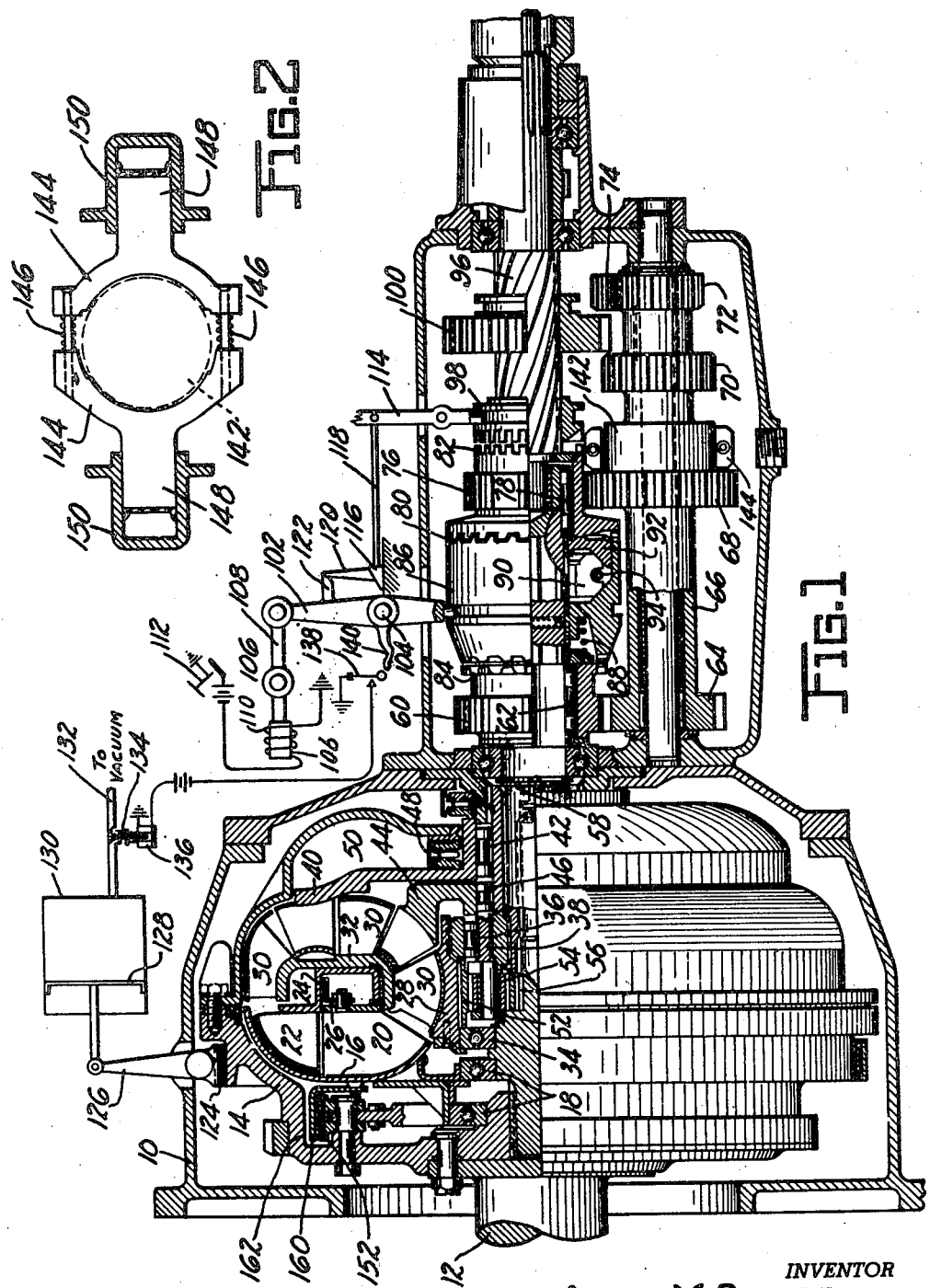

INVENTOR
ADIEL Y. DODGE
BY Dawson, Ooms & Booth
ATTORNEYS

Patented May 27, 1947

2,421,190

UNITED STATES PATENT OFFICE 2,421,190

HYDRAULIC TRANSMISSION CONTROL

Adiel Y. Dodge, Rockford, Ill.

Application April 16, 1941, Serial No. 388,725

4 Claims. (Cl. 74—189.5)

This invention relates to transmissions, and more particularly to transmissions embodying fluid drives of the type suitable for use in automotive vehicles.

One of the objects of the invention is to provide a transmission which is fully automatic from a free condition in which there is no driving connection between the driving and driven shafts through a plurality of torque ranges to a condition of one to one drive. The free condition is obtained by the use of an automatic speed responsive clutch for connecting the input or driving member of the transmission to the driving shaft above a predetermined speed. One of the features of the invention relates to the construction of a clutch of this type which will connect the driving shaft and the driving member at a predetermined speed, and will maintain the connection, once it is made, to a lower speed.

Another object of the invention is to provide a transmission including a fluid unit for operating a gear set in which the speed ratio in the gear set is automatically changed in response to the transmission speed. According to one feature of the invention, the speed ratio of the gear set may be changed at will to a lower ratio, regardless of speed, as for example, when it is desired to obtain rapid acceleration at high speeds.

Another object of the invention is to provide a transmission automatically operable to furnish a plurality of torque ratios, and in which a low speed gear drive and a reverse drive are provided. One feature of the invention relates to an interlocking connection between the low speed and reverse drive and the automatic speed changing mechanism, such as to prevent operation of the automatic mechanism when the transmission is manually controlled to provide low speed or emergency.

Still another object of the invention is to provide a transmission in which shifting to vary the speed ranges can be performed quickly and easily. In connection with automatic changes of speed in the gear unit, there is preferably provided a brake mechanism operated in conjunction with the automatic changing to brake the input member, thereby to facilitate shifting. In connection with manual shifting, there is preferably provided a fluid operated brake acting on an element of the gear set.

The above and other objects, advantages and novel features of the invention will be more readily apparent from the following detailed description when read in connection with the accompanying drawings, in which:

Figure 1 is an axial section with parts in elevation of a transmission embodying the invention;

Figure 2 is a partial section of the gear brake of Figure 1;

Figure 4:
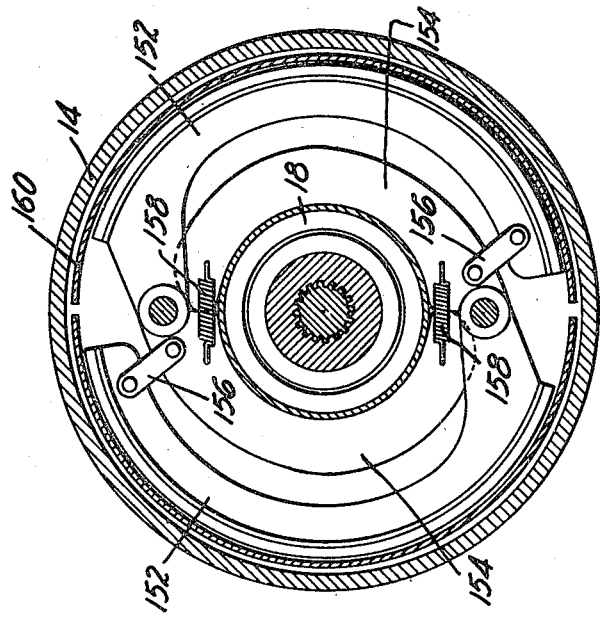
Figure 4 is a section of the speed responsive clutch at right angles to Figure 1.

The transmission of Figure 1 is enclosed in a stationary housing or casing 10, adapted to be mounted in a vehicle in the place of the usual transmission mechanism. A driving shaft 12, which may be the engine crank shaft or an extension thereof, projects into the casing 10 and is connected to a rotatable casing 14, which houses the hydraulic torque transmitting unit.

The hydraulic torque transmitting unit illustrated comprises a driving member or impeller casing 16 rotatably mounted on the driving shaft on bearings 18, and having a series of vanes 20 rigidly secured thereto adjacent its inlet end. A series of vanes 22 is mounted adjacent the outlet ends of the vanes 20, carried by a ring 24. When the impeller is rotating at low speed, the vanes 20 and 22 are free to rotate relatively to each other, but at higher speeds of the impeller they are connected by a speed responsive clutch mechanism 26 so that the vanes 22 form, in effect, a continuation of the vanes 20.

A driven member or rotor structure is mounted on a hub 28 and carries a plurality of sets of rotor vanes 30 interconnected by a core member 32. The hub 28 is rotatably supported on a bearing 34, and on a combined one-way clutch and bearing 36, which prevents forward rotation of the rotor at a speed higher than that of a gear carrier 38.

Two reaction members or stators are provided, having sets of vanes arranged respectively between the spaced sets of rotor vanes, the first stator 40 being supported on a combined one-way clutch and bearing 42 engaging a fixed extension of the housing 10 to prevent rearward rotation of the stator while permitting it to rotate forwardly. The second stator 44 is similarly supported on a separate one-way clutch and bearing 46 operating in the same manner. It will be noted that the casing 14 extends around and is sealed against the stator 40 by a fluid seal 48 of the type more particularly shown and claimed in my co-pending application, Serial No. 379,154, filed February 17, 1941. The casing is so shaped as to form a reservoir space 50 to receive liquid, thereby insuring that the fluid circuit defined by the several vane members will be kept full at all times.

The torque unit drives a planetary differential gear set formed by a ring gear element 52 on the interior of the rotor hub 28, a planet pinion 54 on the gear carrier element 38, and a sun gear element 56 formed on an extension of the driving shaft 12. This construction provides a two-path drive, of the type more particularly described and claimed in my co-pending application, Serial No. 723,083, filed April 30, 1934, which has eventuated in Patent No. 2,242,515, dated May 20, 1941.

The gear carrier 38 is connected to a shaft 58 which extends into the gear box forming an extension of the housing 10, and has rotatably mounted thereon a gear 60. The gear 60 is connected to the shaft 58 by means of a combined one-way clutch and bearing which acts in the negative direction, that is, which permits shaft 58 to overrun the gear 60, but prevents the gear from overrunning the shaft. The gear 60 meshes with a gear 64 on a lay shaft 66, which also carries gears 68, 70 and 72. The gear 72 meshes with a reverse idler 74.

A second gear 76 is rotatable on the shaft 58, being connected thereto by a combined one-way clutch and bearing 78, which may be termed a positive one-way clutch. This means that shaft 58 will drive the gear 76 through one-way clutch 78 in a forward direction, but gear 76 will not drive the shaft. The gear 76 is formed with an elongated hub having at one end a flange 80 formed with clutch teeth in its face, and on its opposite end with a series of clutch teeth 82. Gear 60 is similarly formed with a flange 84 having clutch teeth facing the clutch teeth 80. Between the flanges 80 and 84 there is a collar 86 splined on the shaft 58 and formed on its opposite ends with clutch teeth adapted to engage the teeth 80 and 84 respectively.

The collar 86 is normally urged to the right, as seen in Figure 1, by a compression spring 88, so as to engage the collar with the clutch teeth on the flange 80. In this position, the gear 76 is positively clutched to the shaft 58 to be driven thereby. The clutch collar 86 is adapted to be moved to the left to engage the teeth on flange 84 by means of centrifugal weight members 90, engaging converging cam surfaces on the interior of the clutch sleeve and on a flange 92, which is held against axial movement along the shaft by engagement with the gear 76. The weights 90 are normally urged inwardly by garter spring 94, and at a predetermined speed will move outwardly to cam the clutch collar 86 to the left into engagement with the teeth on flange 84. At this time, gear 60 is connected to the shaft 58, to be driven thereby, and drives the gear 64, and through it, the lay shaft. This turns gear 68, which in turn drives gear 76, the gear sizes being such that gear 76 will be driven at a higher rate of speed than the shaft 58.

In order to connect gear 76 to the driven shaft 96, a clutch collar 98 is splined on the driven shaft and is formed with clutch teeth to engage the clutch teeth 82. In both driving positions, as above described, the clutch collar 78 is moved to its engaged position connecting gear 76 to the driven shaft.

In order to obtain an emergency low and a reverse drive, a gear 100 is splined on the driven shaft 96, and normally occupies a neutral position between the gear 70 and the idler pinion 74. The gear 100 may be shifted by manual controlled mechanism (not shown) into engagement with the gear 70 to provide a low speed forward drive, or may be shifted into engagement with the idler pinion 74 to provide a reverse drive.

In order to provide an over-ruling control between the shaft 58 and the driven shaft when desired, the clutch collar 86 has connected thereto a lever 102 pivoted at 104 so as to be moved when the collar is shifted. At the outer end of the lever 102, a solenoid plunger 106 is connected by link 108, the plunger being slidably mounted in a coil 110. The coil 110 is controlled by a switch, indicated diagrammatically at 112, which may be operated by the usual accelerator pedal when it is fully depressed, or by a separate control pedal or lever, as desired. When the coil 110 is energized, it pulls the plunger 106 to the left, shifting the clutch collar 86 to the right into engagement with the teeth on the flange 80. When the clutch collar 98 is in its engaged position, this provides a direct drive between shaft 58 and the driven shaft 96. It will be apparent that the shift, as above described, may be performed at will at any time, as for example, when rapid acceleration is desired.

To prevent operation of the clutch collar 86 when reverse or low speed positive drive is desired, an interlock is provided between clutch collars 86 and 98. It will be understood in this connection that clutch collar 98 must always be shifted to its disengaged position before shifting the gear 100 into either its forward or reverse drive position, due to a conventional interlocking device (not shown). This shift may readily be effected by mechanical, fluid or other connections from these members to a suitable shift member, disengagement of the clutch collar 98 occurring when the shift member is moved across the H-slot, as in the usual transmission control. As shown, the interlock is provided by a pivoted shift lever 114, connected to the collar 98 and operating a cam member 116 through a rod 118. The cam member controls a locking plunger 120, which is adapted to move into and out of the path of a projecting lug 122 on the lever 102. When the clutch cam 98 is in its disengaged position, as shown, the plunger 120 is cammed upwardly in front of the lug 122, so as to prevent clockwise movement of the lever 102. When the clutch collar 98 is shifted into engaged position, the cam 116 will be moved to the right, allowing the plunger 120 to drop down out of register with the lug 122, thereby permitting free movement of the clutch collar 86. It will be noted that when the lever 102 is moved counter-clockwise by engagement of the plunger 120 with the lug 122, the collar 86 will be cammed to the right, so as to engage the clutch teeth on the flange 80, thereby connecting gear 76 with the shaft 58. At this time, gear 76 drives gear 68, and through it drives the lay shaft, torque being transmitted to the driven shaft from either gear 70 or gear 72 and idler 74 to the gear 100.

In order to facilitate shifting of the clutch sleeve 86, it is desirable to retard operation of the shaft 58 so that the clutch sleeve 86 and the gear member which it is to engage will be operated at more nearly synchronous speeds. For this purpose, a brake 124 is provided, engageable with the casing 14, and operated by a lever 126. The lever 126 is connected to a piston 128, slidable in a cylinder 130, which is connected through a conduit 132 to a source of vacuum such as the intake manifold of the engine. A valve 134 of the three-way poppet type connects the cylinder 130 either to atmosphere or to the conduit 132, and is controlled by a solenoid 136. When the solenoid is de-energized, the valve 134 will occupy the position shown, in which it connects cylinder 130 to atmosphere; but when the solenoid is energized, the valve will be pulled downwardly, closing the atmospheric port and connecting cylinder 132 to vacuum. The solenoid 136 is controlled by a switch 138, which is operated by a finger 140 secured to the lever 102 adjacent its pivot. The switch 138 is normally open, but when the lever 102 is rocked in a clockwise direction, the finger 140 will engage the switch and close it temporarily, to actuate the brake 124. As the lever 102 rocks further, finger 140 will disengage the switch, allowing it to open again.

Shifting of the gear 100 into engagement with either the forward or reverse gear is facilitated by a brake mechanism of the type more particularly illustrated in Figure 2. As shown, the lay shaft 66 is formed with a cylindrical drum portion 142, adapted to be engaged by a pair of arcuate friction members 144, diametrically disposed and urged apart by springs 146. The friction members 144 are formed with pistons 148, slidably received in fixed cylinders 150, which may be supplied with actuating fluid in any desired manner. When the hydraulic pressure in the cylinders 150 is increased, the pistons 148 will move together to press the friction members 144 against the cylindrical portion 142 on the lay shaft, thereby to brake the lay shaft. This enables the gear 100 to be shifted easily into mesh with either the gear 70 or the idler pinion 74.

The transmission as above described is adapted to be connected to the driving shaft by a speed responsive clutch, as shown in Figures 1 and 4. The clutch may be of the general type more particularly described and claimed in my co-pending application, Serial No. 334,706, filed May 13, 1940, which has eventuated in Patent No. 2,355,710, dated August 15, 1944, and comprises a plurality of friction shoes 152, pivotally mounted at one end on the casing 14. Weights 154 also pivotally mounted on the casing 14 are connected to the free ends of the shoes by links 156, so that when the weights move outwardly in response to centrifugal force, the shoes will be urged outwardly by a relatively high pressure. The weights and shoes may be urged inwardly by springs 158, which may be so calibrated as to allow the shoes to move outwardly at any desired speed of the driving shaft.

Outside of the friction shoes 152 there are provided a plurality of similar friction shoes 160, pivoted to the impeller 20 so as to move outwardly in response to the speed thereof. The friction shoes 160 are adapted to engage a drum portion 162 formed on the interior of the casing 14.

In operation, with the parts adjusted for emergency low speed drive, the clutch sleeve 98 will be disengaged from the clutch teeth 82, the clutch sleeve 86 will be shifted to the right, as shown, and the gear 100 will be in mesh with the gear 70. At this time, with the driving shaft 12 turning slowly, there will be no connection between the driving and driven shafts, since the speed responsive clutch will be disengaged. As the speed of the driving shaft increases, the weights 154 force the friction shoes 152 outwardly into engagement with the friction shoes 160, and continue to move outwardly, engaging shoes 160 with the drum surfaces 162. Thus the shoes 160 are gripped between two friction surfaces and the impeller of the hydraulic torque converter will be drivably connected to the shaft 12. The rotor hub 28 will be driven at this time through fluid reaction on the vanes 30, as is understood in the art, and will drive the ring gear 52 at reduced speed and increase the torque, the sun pinion 56 turning with the driving shaft 12. The planet pinions 54 will thus be driven by the sun and ring gears to drive the gear carrier 38 and the shaft 58 at a lower speed and a higher torque than the driving shaft 12. This will drive the gear 76, and through it, will turn the lay shaft and the gear 100, so that the driven shaft will be turned forwardly at low speed and high torque. It will be noted that the speed and torque transmitted to the driven shaft will be varied automatically through an infinite number of ranges by operation of the hydraulic torque converter. If there should be a reversal of torque in this position such that the driven shaft tends to turn the driving shaft, torque will be transmitted back to the driving shaft through the one-way clutch 62 and gear 60, it being noted that the one-way clutch 78 will overrun. Thus, free wheeling is prevented.

For higher forward speeds, the gear 100 is shifted to its neutral position, and clutch sleeve 98 is moved into engagement with clutch teeth 82, thereby freeing the clutch sleeve 86 for automatic operation. This is the normal forward driving position, and the parts will not normally be shifted from this position, except for emergency conditions requiring a low speed drive or for reverse. In this position, the shaft 58 drives the clutch sleeve 86, and through it, the driven shaft through clutch teeth 80 and 82, and clutch sleeve 98. Thus the torque multiplication is that obtained through operation of the hydraulic unit which will provide an automatic variation through an infinite number of speeds up to direct drive between the driving shaft 12 and the driven shaft 96. As the speed increases, the centrifugal members 90 will tend to move outwardly, to cam the sleeve 86 to the left. Due to the friction between clutch teeth 80 and the meshing clutch teeth on sleeve 86, the sleeve will not ordinarily be shifted until the torque load on the clutch teeth is relieved. This can be done by temporarily releasing the accelerator, at which time the clutch sleeve 86 will be shifted to the left by action of the weights. It will be noted that the clutch teeth are formed with a slight ejection angle, so that they will not mesh until substantial synchronism is reached. This is facilitated by operation of the brake 124, which tends to slow down the speed of shaft 58 and clutch sleeve 86 so that its speed will be synchronized with that of the gear 60 very quickly. As soon as the clutch sleeve 86 engages the gear 60, drive will be from shaft 58 through gear 60, and one-way clutch 62 to gear 64, to drive the lay shaft. Gear 68 on the lay shaft will drive gear 76, and the driven shaft, at a speed higher than that of shaft 58. This connection provides lower torque range than that above described, it being noted, however, that an infinite number of speed and torque ratios are possible through operation of the hydraulic unit.

Figure 3:
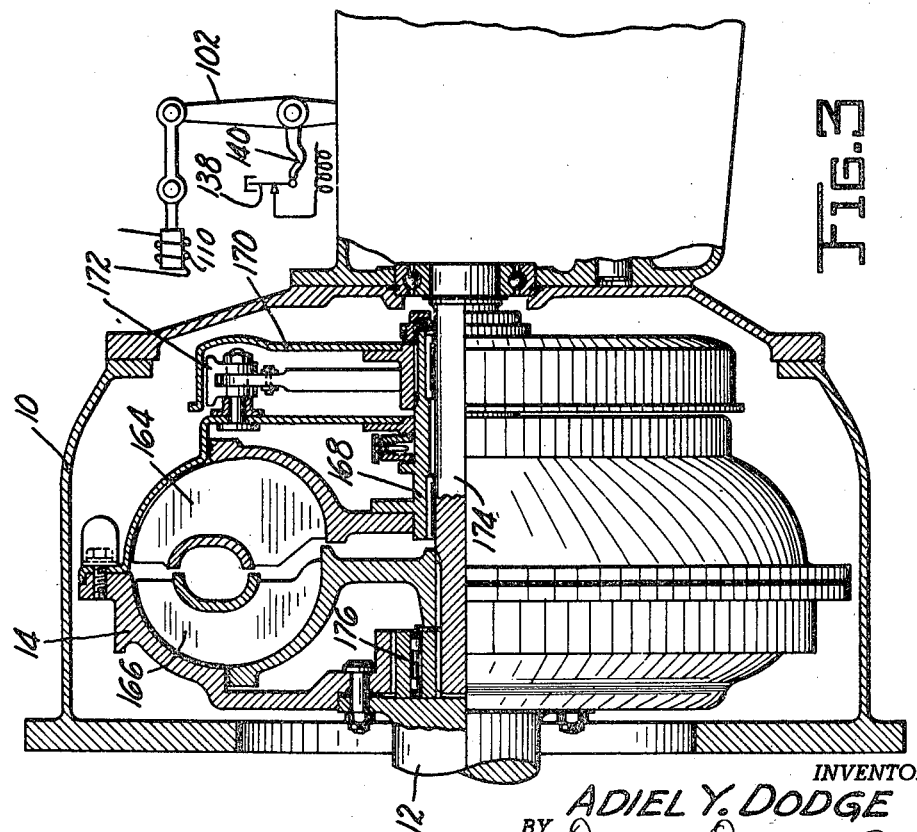
Figure 3 is a partial view similar to Figure 1, illustrating an alternative construction.

Figure 3 illustrates an alternative construction, parts therein corresponding to like parts in Figure 1 being designated by the same reference numerals. In this construction, the hydraulic torque converter of Figure 1 is replaced by a fluid flywheel comprising a vaned impeller 164 and a vaned rotor 166. The impeller 164 is mounted on a sleeve 168, carrying a clutch drum 170 adapted to be engaged by friction shoes 172 pivotally mounted on the casing 14 of the unit. The clutch mechanism indicated generally at 172 may be of the same type as that shown in Figure 4, and described above in connection with Figure 1.

The rotor 166 is connected to a shaft 174 corresponding to the shaft 58 of Figure 1, and similarly connected to the gear unit. A one-way clutch 176 is provided between the shaft 174 and the driving shaft 12, to prevent the shaft 174 from over-running the driving shaft so as to eliminate free wheeling. The operation of this construction is substantially similar to that of the embodiment shown in Figure 1, and will not be described in detail. The differences are primarily that with a fluid flywheel, such as shown in Figure 3, no increase of torque in the hydraulic unit itself is possible, all increases of torque necessarily being provided by the gear unit.

While two embodiments of the invention have been shown and described in detail, it will be understood that these are illustrative only, and are not intended as a definition of the scope of the invention, reference being had for this purpose to the appended claims.

This application is a continuation in part of my pending application, Serial No. 233,844, filed October 7, 1938, now matured into Patent No. 2,311,740, issued February 23, 1943.

What is claimed is:

1. A transmission for connecting a driving shaft to a driven shaft comprising a hydraulic torque transmitting device including a driving member and a driven member, a gear chain connecting the driven member to the driven shaft including a shiftable member to change the torque ratio of the gear chain, means to shift the shiftable member, a clutch responsive to the speed of the driving shaft to connect it to the driving member, a brake engageable with the driving member, and means operated by shifting of the shiftable member to control the brake.

2. A transmission for connecting driving and driven shafts comprising a hydraulic torque transmitting device including driving and driven members, means to connect the driving member to the driving shaft, a differential gear set including three relatively rotatable elements and having one element connected to the driving shaft and another element connected to the driven member, a gear set connecting a third element of the differential gear set to the driven shaft and including shiftable means to change its torque ratio, a brake engageable with the driving member, and means controlled by shifting of the shiftable means to actuate the brake.

3. A transmission for connecting driving and driven shafts comprising a hydraulic torque transmitting device including driving and driven members, means to connect the driving member to the driving shaft, a differential gear set including three relatively rotatable elements and having one element connected to the driving shaft and another element connected to the driven member, a gear set connecting a third element of the differential gear set to the driven shaft and including shiftable means to change its torque ratio, means responsive to the speed of said third element to shift said shiftable means, a brake engageable with the driving member, and means controlled by shifting of the shiftable means to actuate the brake.

4. A transmission for connecting driving and driven shafts comprising a hydraulic torque transmitting device including driving and driven members, means to connect the driving member to the driving shaft, a differential gear set including three relatively rotatable elements and having one element connected to the driving shaft and another element connected to the driven member, a gear set connecting a third element of the differential gear set to the driven shaft and including shiftable means to change its torque ratio, a brake engageable with the driving member, power means to actuate the brake, and electrical control means for the power means including a switch controlled by the shiftable means to engage the brake when the shiftable means is shifting.

ADIEL Y. DODGE.

REFERENCES CITED

The following references are of record in the file of this patent:

UNITED STATES PATENTS

| Number | Name | Date |
|---|---|---|
| 2,084,219 | Salerni | June 15, 1937 |
| 2,076,362 | Boldt et al. | Apr. 6, 1937 |
| 1,969,561 | Keller | Aug. 7, 1934 |
| 1,985,884 | Banker | Jan. 1, 1935 |
| 2,055,300 | Maurer | Sept. 22, 1936 |
| 2,170,649 | Banker | Aug. 22, 1939 |
| 2,008,321 | Vincent | July 16, 1935 |
| 2,071,292 | Woolson | Feb. 16, 1937 |
| 2,055,303 | Patterson | Sept. 22, 1936 |
| 2,197,179 | Hersey | Apr. 16, 1940 |
| 2,267,464 | Iavelli | Dec. 23, 1941 |
| 2,098,691 | Neff | Nov. 9, 1937 |
| 2,097,569 | Kilpela | Nov. 2, 1937 |
| 1,667,565 | Radcliffe | Apr. 24, 1928 |
| 2,011,734 | Sinclair | Aug. 20, 1935 |
| 2,241,764 | Bollinger et al. | May 13, 1941 |
| 2,276,862 | Peterson | Mar. 17, 1942 |
| 2,309,051 | Dodge | Jan. 19, 1943 |
| 1,912,112 | Wunsch | May 30, 1933 |
| 2,202,271 | Sinclair et al. | May 28, 1940 |
| 2,245,017 | Sinclair | June 10, 1941 |
| 2,248,133 | Snow | July 8, 1941 |
| 2,311,740 | Dodge | Feb. 23, 1943 |
| 2,104,608 | Cox et al. | Jan. 4, 1938 |
| 2,102,755 | Sinclair | Dec. 21, 1937 |
| 2,343,304 | LaBrie | Mar. 7, 1944 |
| 2,353,137 | Banker | July 11, 1944 |
| 1,950,163 | Cotterman | Mar. 6, 1934 |
| 2,333,680 | Schneider et al. | Nov. 9, 1943 |

FOREIGN PATENTS

| Number | Country | Date |
|---|---|---|
| 461,947 | Great Britain | Feb. 26, 1937 |
| 489,396 | Great Britain | July 26, 1938 |
| 285,970 | Great Britain | Feb. 23, 1928 |
| 455,699 | Great Britain | July 19, 1935 |
| 680,518 | France | Jan. 22, 1929 |
| 511,747 | Great Britain | Aug. 23, 1939 |